(12) United States Patent
Cavaliere

(10) Patent No.: US 11,517,410 B2
(45) Date of Patent: Dec. 6, 2022

(54) DEVICE FOR CLEANING TEETH

(71) Applicant: Francesco Cavaliere, Solesino (IT)

(72) Inventor: Francesco Cavaliere, Solesino (IT)

( * ) Notice: Subject to any disclaimer, the term of this patent is extended or adjusted under 35 U.S.C. 154(b) by 370 days.

(21) Appl. No.: 16/625,789

(22) PCT Filed: Jun. 22, 2018

(86) PCT No.: PCT/IB2018/054611
§ 371 (c)(1),
(2) Date: Dec. 23, 2019

(87) PCT Pub. No.: WO2018/235040
PCT Pub. Date: Dec. 27, 2018

(65) Prior Publication Data
US 2020/0121430 A1  Apr. 23, 2020

(30) Foreign Application Priority Data
Jun. 22, 2017 (IT) .......................... 102017000069596

(51) Int. Cl.
*A61C 15/04* (2006.01)
(52) U.S. Cl.
CPC .......... *A61C 15/046* (2013.01); *A61C 15/041* (2013.01)
(58) Field of Classification Search
CPC ... A61C 15/046; A61C 15/041; A61C 15/047; A61C 15/048
USPC .................................................. 132/323–329
See application file for complete search history.

(56) References Cited

U.S. PATENT DOCUMENTS

| 4,192,330 | A | * | 3/1980 | Johnson | A61C 15/048 132/323 |
| 4,304,246 | A | | 12/1981 | Yafai | |
| 4,574,823 | A | * | 3/1986 | Uriss | A61C 15/046 132/325 |
| 4,982,752 | A | * | 1/1991 | Rodriguez | A61C 15/046 132/327 |
| 5,123,432 | A | * | 6/1992 | Wyss | A61C 15/046 132/323 |
| 5,224,501 | A | * | 7/1993 | McKenzie | A61C 15/046 132/321 |
| 5,433,227 | A | * | 7/1995 | Chen | A61C 15/046 132/323 |
| 5,469,874 | A | * | 11/1995 | Meyer | A61B 17/32056 132/324 |

(Continued)

FOREIGN PATENT DOCUMENTS

| DE | 202009013996 U | 12/2009 |
| DE | 202009013996 U1 | 12/2009 |

(Continued)

OTHER PUBLICATIONS

Japanese Office Action for JP2020-520848 dated Jul. 5, 2022.

*Primary Examiner* — Nicholas D Lucchesi
(74) *Attorney, Agent, or Firm* — Mark M. Friedman

(57) ABSTRACT

Device for cleaning teeth which comprises a dental floss fork provided with a grippable handle and with two rods with free ends spaced from each other and a dental floss, which is mounted with a bridge section between the free ends of the two rods of the dental floss fork. The dental floss has annular extension and the dental floss fork is provided with a guide, in which the dental floss is housed, for supporting it along its annular extension. The dental floss is slidably mounted within the guide.

11 Claims, 2 Drawing Sheets

(56) References Cited

U.S. PATENT DOCUMENTS

| | | | | |
|---|---|---|---|---|
| 5,538,023 | A | * | 7/1996 | Oczkowski .......... A61C 15/046 132/323 |
| 5,799,674 | A | * | 9/1998 | Ali ...................... A61C 15/046 132/324 |
| 6,055,993 | A | * | 5/2000 | Meyer .............. A61B 17/32056 132/327 |
| 6,220,257 | B1 | * | 4/2001 | Meyer .............. A61B 17/32056 132/327 |
| 6,363,949 | B1 | | 4/2002 | Brown |
| D738,044 | S | * | 9/2015 | Miles, Jr. ...................... D28/66 |
| 2007/0131242 | A1 | | 6/2007 | Fleck |
| 2015/0059791 | A1 | | 3/2015 | Sheppel |
| 2017/0105822 | A1 | | 4/2017 | Hayes |
| 2018/0140397 | A1 | * | 5/2018 | Kozak .................. A61C 15/045 |

FOREIGN PATENT DOCUMENTS

| | | |
|---|---|---|
| DE | 102015003021 A1 | 9/2016 |
| DE | 102015013326 A1 | 4/2017 |
| EP | 2145559 A1 | 1/2010 |
| JP | 2005224573 A | 8/2005 |
| JP | 2008-526406 A | 7/2008 |

* cited by examiner

DEVICE FOR CLEANING TEETH

FIELD OF APPLICATION

The present invention regards a device for cleaning teeth according to the preamble of the main independent claim.

The present device consists of an innovative dental floss fork and of a dental floss, and is intended for a use that is per se entirely conventional for interdental cleaning.

STATE OF THE ART

As is known, dental floss serves for removing the bacterial plaque and the food residues that are situated in the interdental spaces. This operation, if it is carried out with the thread wound around the fingers, is uncomfortable and slow, while it is less difficult if carried out with a device for cleaning teeth of the type in which the thread is applied to a dental floss fork.

The forks and the threads of the devices which are found on the market have drawbacks and defects which limit the use thereof to a small percentage of the population. Devices for cleaning teeth are known, in which the forks are of disposable type, are not very easy to use since they are too small, and have an overly big thread for normal teeth sets, totally or partially constituted by teeth in contact with each other. Such thread of the abovementioned devices of known type is only able to penetrate between a few teeth and with difficulty, causing an unpleasant sensation that induces the inexperienced user to give up this practice.

Devices for cleaning teeth are also known that are provided with large forks, which are less difficult to use and can mount a thin and flat thread, which nevertheless still enters between the teeth with difficulty, causing discomfort (even if to a lesser extent than in the preceding case) and still rendering this practice unpleasant and hence not very common.

It is therefore assumed that these thin and flat threads of the abovementioned devices for cleaning teeth are used in the spaced teeth, which of course does not cause unpleasant sensations. Further drawback of the abovementioned devices of known type lies in the fact that the employed flat threads require a frequent substitution, as they can be used for about 2-3 times (for the entire set of teeth) before being broken.

In general, an important drawback of the common devices for cleaning teeth of known type formed by forks and by dental flosses is the need to frequently substitute the thread, after each breakage—an operation that is rather tedious.

No other fork has been found with a thread that is the same or fairly similar to that used in the fork of the invention, but only other forks which have only partial similarities with the fork of the invention. These known forks present serious defects, and therefore they would have an unpleasant, slow and slow use.

Document EP 2145559 discloses a devices for cleaning teeth comprising a fork having flexible short and curved arms, so that it is not possible to mount a flat dental floss since it would be oblique with respect to the spaces between the teeth so that it would be difficult to insert the floss between the teeth and the floss would be subjected to frequent breakage. Moreover, the insertion of a normal flat dental floss would be unpleasant. And it would not be possible to straighten a flat dental floss if it became twisted. The dental floss is arranged in a loop, that it is to much short and not correctly guided around the body of the device.

Document U.S. Pat. No. 4,304,246 discloses a devices for cleaning teeth comprising a straight and flexible fork, but which is devoid of a handle. The fork is held by grasping an arm, so inserting it between the teeth would be a difficult and slow process, because the handle is clearly essential in order for the fork to be used easily and precisely to insert the dental floss between the teeth, which touch, or almost touch one another. It would be like using a toothbrush without a handle: it is easy to imagine how awkward that would be. Moreover, a normal flat dental floss would cause unpleasant sensations during its insertion, unlike the flat and very thin dental floss of the device of the present invention. Document US 2015/059791 discloses a devices for cleaning teeth comprising a a wide, flat, straight fork having a bulky, complex system for tensioning the looped dental floss, consisting of a carrier that slides on a guide (which is missing), a small shaft inside the carrier, and a spring that presses against the carrier. Differently according to a preferred feature of the present invention the dental floss is tensioned on the fork and replaced in an easy and convenient system, i.e., by means of two long, flexible arms of the fork. The dental floss is very short so that it would not last long. Moreover the dental floss of this known device is flat, but its width is variable rather than constant (as would be necessary), and so it would cause unpleasant sensations during its insertion, unlike the dental floss of fork of the device of the present invention, which has a very small thickness.

Document JP 2005 224573 discloses a dental floss made of semi-sintered PTFE and an industrial procedure for the manufacture thereof.

The dental floss, as disclosed in the claims, is narrow and thin, with a thickness of 50-200 μm, whereas in the description the thickness is given as 20-75 μm. The declared purpose of such thin, resistant dental floss, is to enter easily between tightly set teeth, and massage the gums. Reducing the thickness of the dental floss would apparently reduce its strength and so, to prevent frequent breakage, its resistance is increased by means of an appropriate manufacturing procedure.

In actual fact, any flat dental floss according to this patent would break easily when mounted on the fork of a devices for cleaning teeth of the above mentioned documents, because its initial position would be oblique with respect to the space between the teeth, which would obstruct its insertion, so that the dental floss would become deformed, it would wear out and break. This oblique position of the dental floss is due to the curved or oblique shape of the conventional forks. Therefore, the frequent breakage of the dental floss would not due to the fact that it is thin, but because of its oblique position with respect to the space between the teeth, which makes it difficult to insert. This drawback was discovered when using the flat dental floss mounted on the conventional forks with this curved or oblique design available on the market. On the contrary, with a flat dental floss aligned with the space between the teeth according to the present invention, the dental floss enters easily and is durable. Such alignment is obtained by means of the straight fork.

PRESENTATION OF THE INVENTION

In this situation, the problem underlying the present invention is therefore that of overcoming the drawbacks manifested by the solutions of known type, by providing a device for cleaning teeth, which is comfortable for the user even when the thread is made to pass through teeth that are close together.

A further object of the present invention is to provide a device for cleaning teeth, which is easy and simple to use.

A further object of the present invention is to provide a device for cleaning teeth, which allows carrying out the interdental cleaning in a quick manner (e.g. in about one minute) and in a particularly effective manner.

A further object of the present invention is to provide a device for cleaning teeth, which is inexpensive to make.

A further object of the present invention is to provide a device for cleaning teeth, which requires little maintenance.

A further object of the present invention is to provide a device for cleaning teeth, which is of long duration.

BRIEF DESCRIPTION OF THE DRAWINGS

The technical characteristics of the invention, according to the aforesaid objects, can be clearly found in the contents of the below-reported claims and the advantages thereof will be more evident in the following detailed description, made with reference to the enclosed drawings, which represent several merely exemplifying and non-limiting embodiments of the invention, in which:

FIG. 3 shows a plan view of the device for cleaning teeth, object of the present invention in accordance with a second embodiment;

DETAILED DESCRIPTION OF A PREFERRED EMBODIMENT

Figure 1:
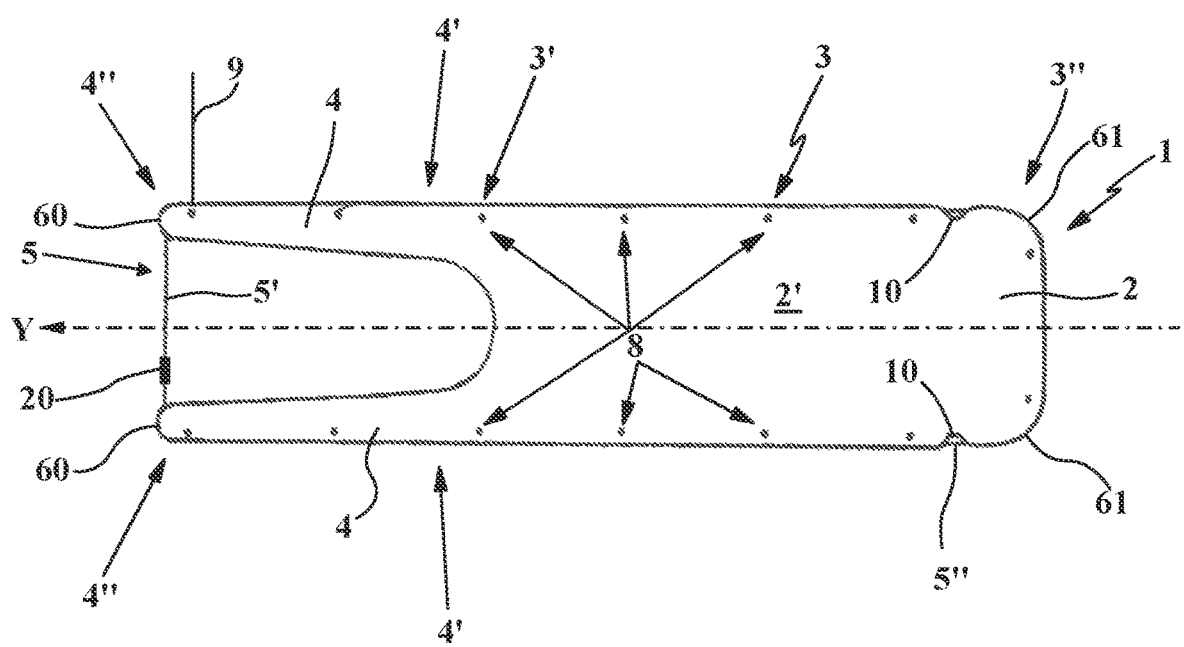
FIG. 1 shows a plan view of the device for cleaning teeth, object of the present invention, in accordance with a first embodiment.

With reference to the enclosed drawings, reference number 1 overall indicates the device for cleaning teeth, object of the present invention.

This comprises, in a per se conventional manner, a dental floss fork 2 provided with a handle 3 that can be gripped by a user provided with a longitudinal extension between a first end 3' and a second end 3", and with two rods 4, which are extended with a first constrained end 4' thereof, from the first end 3' of the handle 3, which they therefore share, up to respective free ends 4" thereof. The latter are spaced from each other for a distance D, which can be advantageously equal to the width L of the handle 3, in accordance with the embodiment of FIG. 1.

The device for dental cleaning 1 also comprises a dental floss 5, which is associated with the free ends 4" of the rods 4 of the dental floss fork 1, between which a bridge section 5' is defined.

According to the idea underlying the present invention, the dental floss 5 has an annular extension composed of the aforesaid bridge section 5' as well as of the remaining complementary section 5". In addition, the dental floss fork 2 is provided with guide means 6, in which the dental floss 5 is housed, in order to support the dental floss 5 itself along its annular extension. The dental floss 5 is slidably mounted within the guide means 6.

In other words, the dental floss employed in the present device 1 is entirely original, having annular extension or lacking ends, or with the ends that are constrained to each other, in a manner such that the thread forms, as stated, a close loop or in other words that resembles a transmission belt, so as to be able to determine an "annular thread".

For such purpose, the annular dental floss 5 is made as a loop without interruption or with the ends of a thread segment that are welded, knotted, or glued to each other in order to form the closed ring 2.

In this manner, for example after having used the dental floss 5 for cleaning the entire set of teeth, it is moved with a simple manual maneuver, making it slide within the guide means 6 of the dental floss fork 2, along its annular extension and hence moving the worn thread part away from the space comprised between the rods 4.

This allows a long duration of the dental floss 5, which can be used dozens of times, before substituting it, rather than only about 2-3 times, as in the devices for dental cleaning of known type.

The annular thread is housed in the guide means which advantageously are in the form of a groove 6 which preferably surrounds the dental floss fork 2. The groove 6 can also be partial, i.e. it can be present at the free end 4" of the rods 4 and in the curves of the handle 3, and partially or completely be lacking outside the rods 4 and handle 3.

Figure 2:
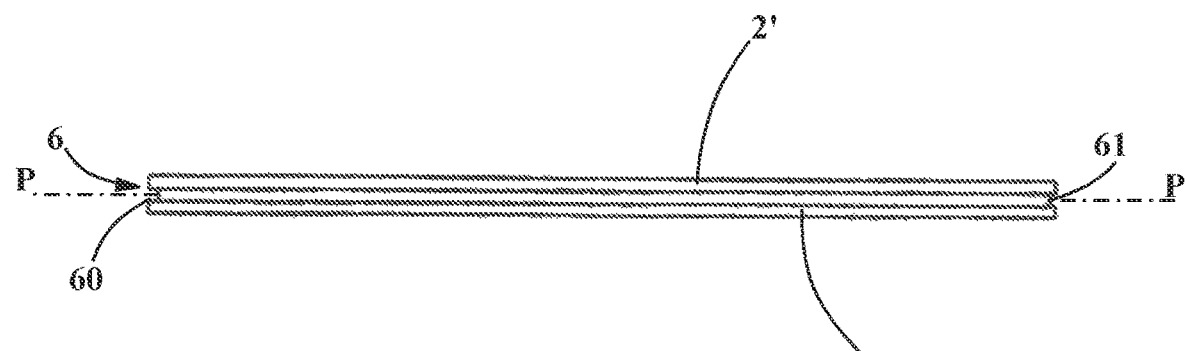
FIG. 2 shows a side view of the device for cleaning teeth, object of the present invention, illustrated in FIG. 1.

Advantageously in accordance with the embodiment illustrated in the enclosed FIGS. 1-2, the dental floss fork 2 has a flattened form with its two opposite faces 2', 2" parallel and with extension substantially on a lying plane P.

Such flat dental floss fork 2 is extended along a rectilinear main direction Y with the rods 4, which in the case of the first embodiment of FIGS. 1 and 2 are parallel to each other as well as parallel to the aforesaid rectilinear extension direction Y.

The use of the device 1 is facilitated by the straight linear form of the rods 4 of the dental floss fork 2.

Advantageously, in this case, the groove 6 is for example made by means of multiple groove portions, of which two first portions indicated with 60 are provided at the free ends 4" of the rods 4 and other second portions indicated with 61 are provided at curves of the handle 3.

Preferably, the annular dental floss 5 is provided with at least one reference mark 20 (shown as an example in FIG. 2 with a thicker section), in particular obtained with a colored mark on the thread, in order to identify a corresponding position thereof in its annular extension. It is advantageously possible to provide for a plurality of marks 8 that are equidistant from each other along the rods 4 and along the perimeter edge of the handle 3 in order to define abutments with respect to the aforesaid reference mark on the annular dental floss 5.

Preferably, the device comprises one or two thread segments 9, each of which fixed to the annular dental floss and susceptible of being gripped between the fingers of a user in order to make the annular dental floss 5 slide within the guide means 6. Advantageously, each thread segment 9 can constitute not only an aid for the sliding of the annular dental floss 5 but also for defining the reference mark 20 on the thread 5 itself.

The two rods 4 are elastically flexible and susceptible of being manually approached in order to loosen the tension of the annular dental floss 5, allowing the sliding of the same dental floss 5 in the guide means 6 with a reduced friction, with respect to when the rods are released and stretch the thread 2, increasing the ring perimeter thereof.

In operation, the annular dental floss 5 is susceptible of being manually gripped in the space between the ends of the rods 4 of the dental floss fork 2 in order to be moved along its annular extension.

Therefore, in operation, in order to facilitate the movement of the annular dental floss 5, it is opportune that at least one short thread segment 9 is constrained thereto, such thread held between the fingers and stretched, and simultaneously with the other hand the free ends 4" of the rods 4 are slightly approached, pushing them closer together, in order to loosen the tension of the thread and the friction thereof with the dental floss fork 2. If instead such thread segment 9 is missing, the annular thread 2 can be moved, holding it between the fingers in the section comprised between the rods 4. In order to advance the thread by the right distance, the following will be observed: the position of the short thread segment 9 or of the welding of the thread which joins together the ends thereof in order to form it as a ring, or of the reference mark 20, e.g. colored, present in the thread itself, periodically aligning it with the series of equidistant marks 8 present in the rods 4 and peripherally around the edge of the handle 3.

The dental floss 5 is advantageously a flat thread, which in the advantageous case in which the dental floss fork 2 has a flattened form, is annularly extended with its width substantially arranged orthogonal to the lying plane P of said dental floss fork 2.

In the case of the embodiment of FIGS. 1 and 2, the dental floss 5 has ring-like extension with approximately rectangular shape, when it is mounted in the groove 6 of the guide means of the dental floss fork 2. In accordance with such embodiment the groove 6 is perimetrically extended, surrounding the dental floss fork 2, or with sections of peripheral grooves arranged as mentioned above.

In the case of use of flat annular dental floss 5, this advantageously has a width smaller than that of common flat threads. The thickness is the same or even thinner. This allows it to penetrate between the teeth and exit therefrom with a moderate resistance and quickly, eliminating the unpleasant sensation that is typical of the common flat threads.

It is also possible that the same result can be obtained with a thread with circular section or another shape, but in any case with a section of the thread that is smaller than that of the threads found on the market.

For the sets of teeth constituted by teeth slight spaced, it is instead opportune to use wider or thicker threads.

Figure 3A:
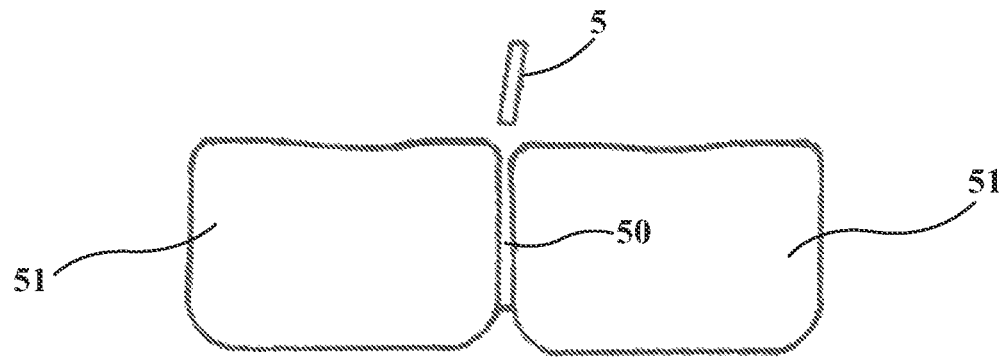
FIG. 3A shows the dental floss of an advantageous embodiment of a device for cleaning teeth, object of the present invention, of flat type and supported by provided straight rods of the device in a position nearly parallel to the interdental surfaces.
Figure 3B:
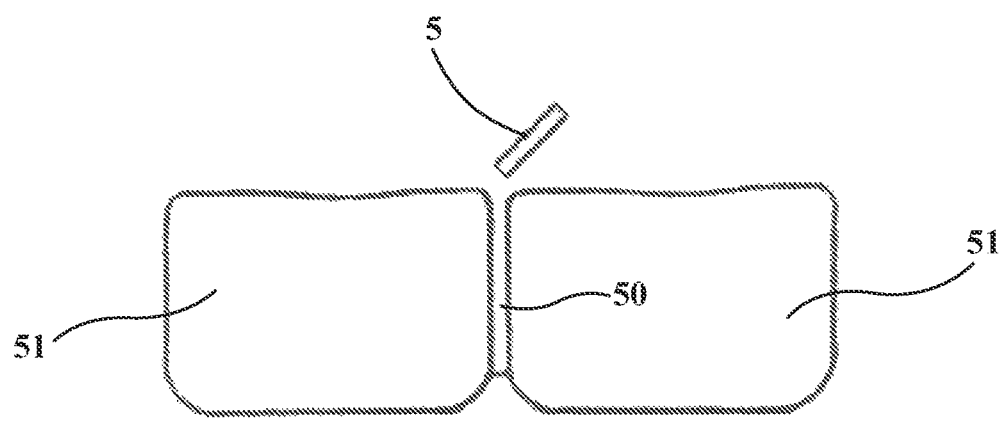
FIG. 3B shows the dental floss of a device for cleaning teeth of known type, which is supported by the provided oblique rods of the device in an oblique position with respect to the interdental surfaces.

The curved or oblique shape of the rods is in fact necessary for the small forks, while for the large forks it is advantageous to have a straight form of the rods, preferably claimed in the present patent, since in such a manner the flat thread 5 is nearly parallel to the interdental surfaces (as illustrated in FIG. 3A), and hence the insertion of the thread 5 in the space 50 between teeth 51 is easier, while with the rods curved or oblique, the flat thread would be oblique with respect to the same interdental surfaces (as illustrated in FIG. 3B), and therefore the insertion in the space 50 between teeth 51 would not be as easy and the thread 5 would tend to be deformed, worn and broken.

Another advantage of the straight rods 4 is that the dental floss fork 2 can be indiscriminately used from both sides, unlike the dental floss forks with oblique rods which can only be used from one side, for a dental arch, and then must be turned in order to treat the other arch.

The device 1 according to the invention also comprises at least one transverse cavity 10 arranged on the peripheral edge of the handle 3 of the dental floss fork 2, traversed by the annular dental floss 5, in order to easily access the same.

More particularly, in the peripheral edge of the handle 3 of the fork, preferably two small transverse cavities 10 are obtained which serve to insert a tool—similar to a long toothpick—with which a possible slightly twisted dental floss is straightened.

The dental floss 5 is applied on the dental floss fork 2 with a simple maneuver, which generally requires about two minutes, by employing the abovementioned tool similar to a long toothpick or also a similar tool.

The use of a flat thread that is narrower (with respect to the common flat threads), allows inserting and extracting the thread itself, with a moderate resistance by the teeth.

From a recent experimentation, it was ascertained that this essential advantage can also be obtained by using a thread of normal width, but of smaller thickness. The dental flosses that are found on the market have an excessive thickness (usually about 0.18 mm), so that their insertion between the teeth (of normal sets of teeth) is unpleasant, and therefore is regularly used only by a few people. The advantageously flat annular dental floss 5, object of the present invention, is instead thinner, so that when it enters between the teeth it encounters a moderate resistance (and hence causes less discomfort), and grazes/scrapes over most of the interdental surfaces, so as to remove the bacterial plaque. The thickness of the dental floss is comprised between 0.07 and 0.09 mm and preferably is about 0.08 mm. In the case of flat dental floss 5 the thickness must be intended as referred to the depth of the band and not to its width.

The aforesaid reduced thickness of the dental floss confers a greater ease of use of the device, object of the present invention, in particular in connection to the embodiment of FIGS. 1 and 2 with the rods 4 parallel to each other and aligned with the rectilinear main direction Y of the dental floss fork 2.

The invention claimed is:

1. Device for cleaning teeth which comprises:
    a dental floss fork (2) provided with:
        a handle (3) that can be gripped by a user, and
        two rods (4) which are extended from a first common end (3') of said handle (3) up to respective free ends (4") thereof that are spaced from each other;
    a dental floss (5), which is mounted with a bridge section (5') between the free ends (4") of the two rods (4) of said dental floss fork (2);
    wherein said dental floss (5) has annular extension composed of said bridge section (5') and of a complementary section (5"); said dental floss fork (2) being provided with guide means (6), in which said dental floss (5) is housed, in order to support said dental floss (5) along its annular extension; said dental floss (5) being slidably mounted within said guide means (6);
    wherein said dental floss fork (2) has a flattened form, which is extended along a rectilinear main direction (Y) with the rods (4) parallel to each other and to said rectilinear extension direction (Y);
    characterized in that said dental floss (5) is a flat thread, which is annularly extended with its width which is substantially orthogonal to a lying plane (P) of said dental floss fork (2).

2. Device for cleaning teeth according to claim 1, characterized in that said guide means (6) for said dental floss (5) are in the form of at least one groove, of which two first portions (60) are provided at the top of the free ends (4") of said rods (4) and second portions (61) are provided at curves of said handle (3).

3. Device for cleaning teeth according to claim 1, characterized in that said guide means (6) are in the form of a groove (6) which is perimetrically extended, surrounding the dental floss fork (2).

4. Device for cleaning teeth according to claim 1 characterized in that it comprises one or more short thread segments (9), each of which fixed to said dental floss (5) and susceptible of being gripped between the fingers of a user in order to make said dental floss (5) slide in said guide means (6).

5. Device for cleaning teeth according to claim 1, characterized in that said two rods (4) are elastically flexible and capable of being squeezed together in order to loosen the tension of said dental floss (5), allowing the sliding of said dental floss (5) in said guide means (6) with reduced friction.

6. Device for cleaning teeth according to claim 1, characterized in that said dental floss (5) is capable of being manually gripped in the space between the free ends (4") of the rods (4) of said dental floss fork (2) in order to be moved along its annular extension.

7. Device for cleaning teeth according to claim 1, characterized in that said dental floss (5) is provided with at least one reference mark (20), obtained with a colored mark on said dental floss (5), in order to identify a corresponding position thereof in the annular extension of annular said dental floss (5).

8. Device for cleaning teeth according to claim 1, characterized in that it comprises a plurality of marks (8) equidistant along said rods (4) and along a perimeter edge of said handle (3) in order to define abutments with respect to a reference mark (20) on said annular dental floss (5).

9. Device for cleaning teeth according to claim 1, characterized in that it comprises at least one transverse cavity (10) on a peripheral edge of said handle (3) of said dental floss fork (2), traversed by said dental floss (5), in order to be able to easily access the same.

10. Device for cleaning teeth according to claim 1, characterized in that said dental floss (5) is annularly extended due to its ends welded, knotted, or glued to each other.

11. Device for cleaning teeth according to claim 1, characterized in that said dental floss (5) is flat, and has thickness comprised between 0.07 and 0.09 mm.

\* \* \* \* \*